INVENTORS:
G. J. BOYLE
L. F. CREASER
D. REECE

INVENTORS:
G. J. BOYLE
L. F. CREASER
D. REECE

THEIR ATTORNEY

United States Patent Office 3,502,439
Patented Mar. 24, 1970

3,502,439
PORTABLE GAS-LEAK DETECTOR
Donald Reece, Lower Bebington, Leonard F. Creaser, Neston, and George J. Boyle, Thornton Hough, England, assignors to Shell Oil Company, New York, N.Y., a corporation of Delaware
Filed July 13, 1967, Ser. No. 653,146
Claims priority, application Great Britain, Dec. 19, 1966, 56,731/66
Int. Cl. G01n 27/62, 31/12
U.S. Cl. 23—254                    3 Claims

ABSTRACT OF THE DISCLOSURE

A portable apparatus for detecting small leaks in buried gas mains using a flame-ionization detector to detect the trace amounts of the escaping gases. A pump is used to collect a sample of the atmosphere that is then used to support the combustion in the detector and sweep the combustion products from the detector. A small tank of hydrogen is mounted on apparatus to supply the combustion gas for the detector.

BACKGROUND OF THE INVENTION

Apparatus at present in general use for detecting leaks in gas mains and service pipes is large, cumbersome and expensive to operate. One apparatus is mounted on a road vehicle and requires an operating team of three men. Another apparatus although designed to be carried and operated by one man is nevertheless bulky, heavy and can be uncomfortable to use for any length of time.

Natural gas is being introduced on an ever increasing scale into gas systems, and it has been found that due to the "drying out" effect of natural gas on the seals between joints and lengths of pipes there arises a sharp increase in the number of leaks in the system. It is thus desirable to provide a leak detector which is simple and inexpensive to operate and which can readily be carried by one man.

It is known to use a hydrogen flame-ionization detector for detecting the presence of hydrocarbons in gas samples introduced into the detector. The presence of hydrocarbons in the gas samples is indicated by a change in current produced by the migration to the electrodes of the detector of combustion ions produced in the hydrogen flame. These current changes are passed to an amplifier and then recorder. However, it is necessary to provide an atmosphere within the detector to support the flame and also to flush or clean out the products of combustion so that a stagnant atmosphere does not collect within the detector. In the past such a supporting and cleansing atmosphere has been supplied by cylinders of oxygen or compressed air which add considerably to the bulk and weight of the apparatus.

BRIEF DESCRIPTION OF THE INVENTION

The present invention seeks to provide a lightweight portable leak detector which can be carried readily by one man and which utilizes the hydrocarbon containing gases themselves for supporting the flame and cleansing out the detector.

According to the present invention a portable apparatus for detecting the presence of hydrocarbons in gas samples comprises a hydrogen flame-ionization detector, a pump for supplying gas suspected of contamination with hydrocarbons to the detector along major and minor flow rate paths, the minor flow rate being directed into the burner of the detector for intermixing and burning at a jet with hydrogen supplied thereto and the major flow rate being directed into the detector to provide a supporting atmosphere for the flame and to remove products of combustion from the interior of the detector, and means for detecting current changes produced by the detector due to the presence of hydrocarbons in the gas.

Preferably, the inlet side of the pump is connected to an elongated probe through which the gas is introduced into the apparatus.

The means for detecting the current changes resulting from the presence of hydrocarbons in the gas comprises an amplifier and a recorder, the recorder preferably emitting an audible signal. Alternatively the recorder can be a chart recorder or a meter. The amplifier is preferably in the form of a current/frequency converter.

The apparatus is compact and of light weight. It is preferably mounted upon a harness or frame so that it can be carried by a single operator. In use the operator walks along the course of a suspected gas main or service pipe with the free end of the probe held in close proximity to the ground. Whenever a leak in the gas main or pipe is encountered, the detector emits a signal and the operator notes the geographical position of the leak so that subsequent repairs can be carried out.

BRIEF DESCRIPTION OF DRAWINGS

The advantage of the invention will be more easily understood from the following detailed description when taken in conjunction with the accompanying drawings in which.

DESCRIPTION OF PREFERRED EMBODIMENT

Figure 1:
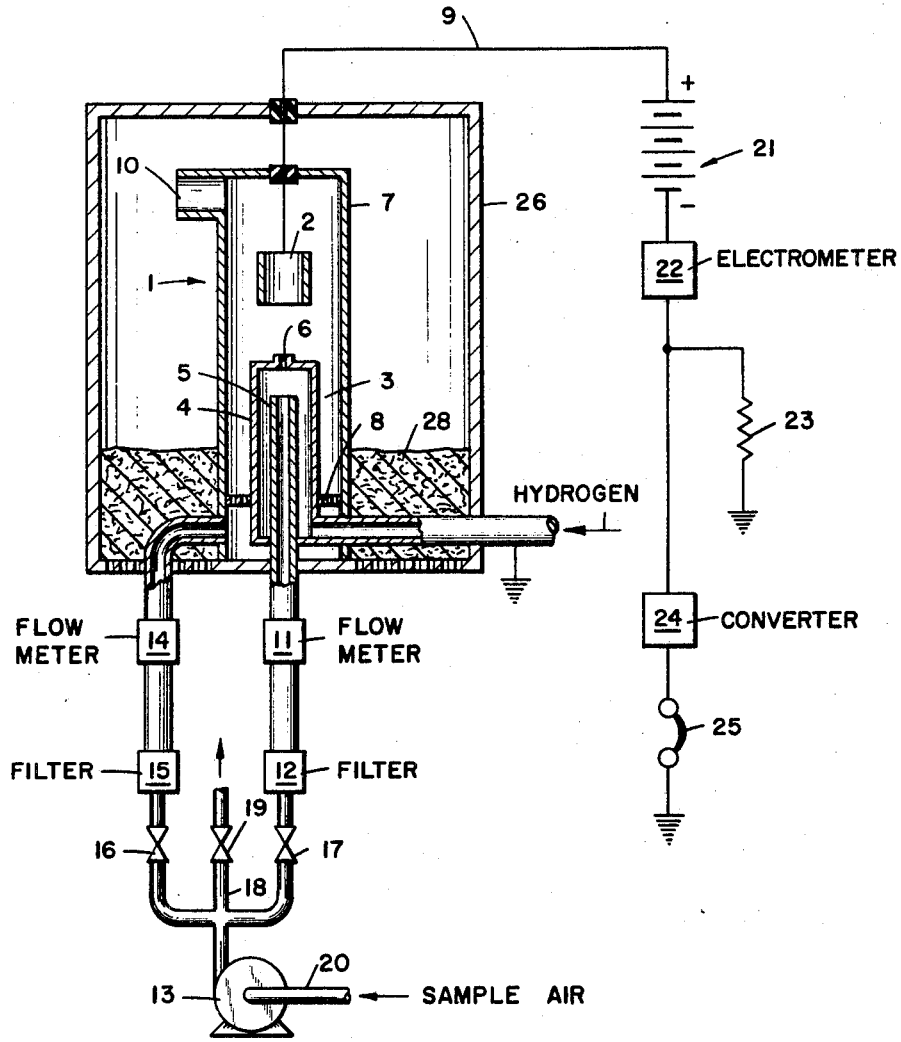
FIGURE 1 illustrates diagrammatically a first embodiment of an apparatus for detecting leakages in gas mains and service pipes.

As shown in FIGURE 1, the hydrogen flame-ionization detector 1 comprises an upper electrode 2 and a lower electrode 3. Electrode 2 is cylindrical in form and open at both ends while electrode 3 which forms the burner of the detector, comprises an outer conduit 4 within which is arranged coaxially a conduit 5. The upper end of the conduit 4 protrudes beyond the adjacent end of the conduit 5 and terminates in a small orifice or jet 6. The electrodes are located within a cylindrical housing 7 having a perforated plate 8 adjacent to the lower end thereof. The housing 7 is in turn located within a casing 26, closed at its upper end and having a perforated lower end plate 27 supporting glass wool 28. The purpose of the glass wool is to prevent drafts entering the detector. A lead 9 from the upper electrode passes through but is insulated from the housing 7 and the casing 26, and the housing is provided with an exhaust outlet 10 for the gases which flow through the detector.

The inner conduit 5 is connected to a flow meter 11 which in turn is connected to a filter 12 and a battery-operated diaphragm pump 13. The interior of the housing 7 is likewise connected to a flow meter 14, a filter 15 and the pump 13. A valve 16 is included in the conduit between the pump 13 and the filter 15 which valve regulates the rate of gas flow through the flowmeters. A valve 17 may be included in the conduit between the pump 13 and the filter 12 to provide additional control. A conduit 18, which is also controlled by a valve 19, is in communication with the pump 13, but this conduit opens directly to atmosphere. Alternatively, this conduit 18 can extend into the upper reaches of the casing 26 to provide a down draft for assistance in flushing out the detector. The inlet or upstream side of the pump 13 is connected to a hand probe 20 which comprises a length of narrow tube which can terminate in a funnel (not shown).

The conduit 4 is connected to a container of hydrogen (not shown) with again a valve or tap being provided in the coupling between the conduit and container to regulate and control the supply of hydrogen to the detector.

Hydrogen is supplied to the detector at a rate of approximately 30 mls./min. and air or air contaminated with gas is pumped through flowmeter 11 at approximately 40 mls./min. and through flowmeter 14 at approximately 300 mls./min. The function of the perforated plate 8 is to impart a uniform flow to the air or air contaminated with gas over the interior of the housing 7. This flow supports the flame and flushes combustion products out of the detector. A major portion of the output from the pump is exhausted to atmosphere through the conduit 18 either directly or through the interior of the casing 26, in order to maintain a high linear velocity through the flowmeters to achieve a fast response time of the detector.

The housing 7 and the lower electrode 3 are grounded while lead 9 from the upper cylindrical electrode 2 is connected to the positive terminal of a battery 21. The battery 21 maintains a potential difference of the order of 100 V. across the electrodes. The negative terminal of the battery is connected to an electrometer 22 which amplifies the current from the detector. This current is generally less than $10^{-8}$ amp. Consequently, the electrometer should be capable of functioning with currents of the order of $10^{-12}$ amp so as to leave a sufficient margin of current available for amplification.

The amplified current from the electrometer passes across a resistor 23 and the resulting voltage is converted by a voltage/frequency converter 24 into a frequency response which is detectable by headphone 25. The electrometer, resistor and converter may be combined into a single current/frequency converter unit.

The complete apparatus is mounted as a unit on a harness or frame enabling it to be readily carried by one operator. In this respect it is to be noted that the apparatus does not utilize a separate source of air or oxygen for flushing the detector and supporting the flame, but relies on a portion of the output of the pump to achieve this. This considerably reduces the bulk and weight of the apparatus.

In use, an operator carries the apparatus on his back and walks along the course of a suspected leaking gas main with the free end of the probe close to the ground. With the pump operating, and hydrogen flowing to and ignited at the jet, air is drawn into the apparatus and passes along the flowmeters to the detector. Combustion ions produced by the flame migrate to the electrodes to produce a small current which is amplified to produce a signal. When hydrocarbons enter the detector with the air, which results when the probe is in the immediate vicinity of a leak, the hydrocarbons produce an increase in the current output from the detector. This increase gives rise to a change in the signal heard by the operator and indicates the poistion of a leak in the gas main.

Figure 2:
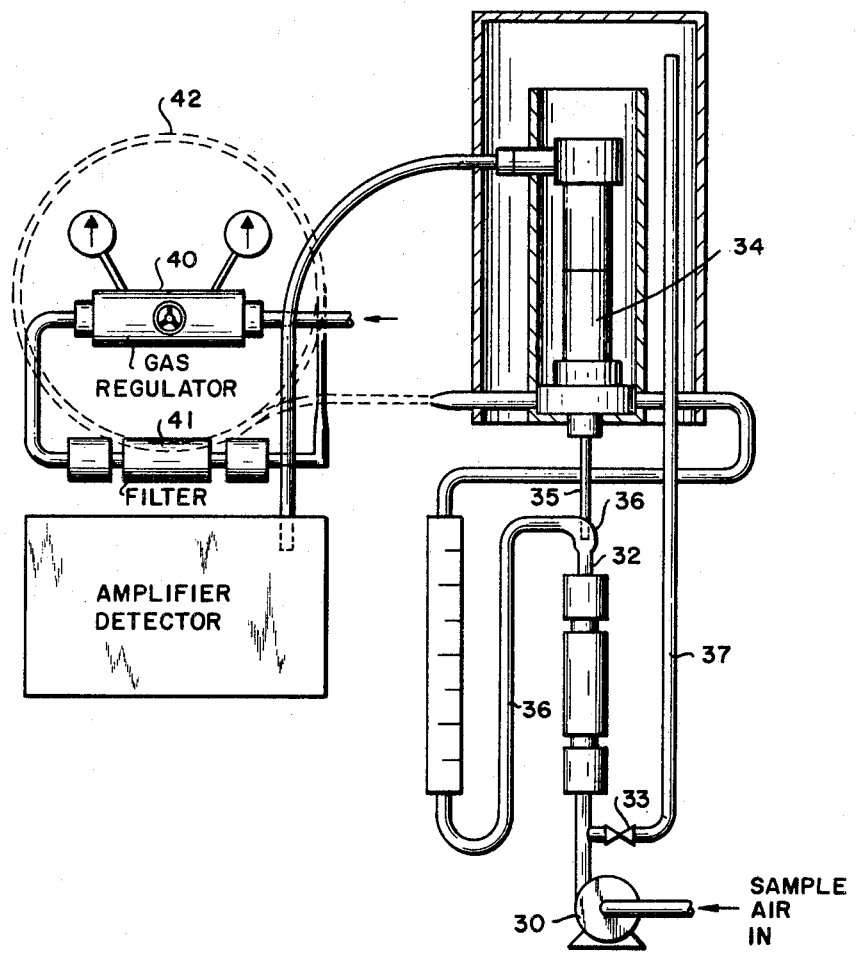
FIGURE 2 illustrates diagrammatically a second embodiment of such an apparatus.

FIGURE 2 illustrates a second embodiment of the apparatus. In FIGURE 2 a pump 30 delivers contaminated air to filter 31 and a conduit 32. A conduit 37, having an adjustable valve or tap 33, is arranged between the pump 30 and filter 31 and opens as before either directly to the atmosphere or into the interior of the casing of the detector.

The conduit 32 is connected to a proportionator 36 that divides the air stream into two streams. One stream is a sample stream 35 that is connected to the burner of the detector while the other stream 36 provides the flame-supporting atmosphere. The flow through the stream 35 can be controlled by forming the conduit of capillary tubing of relatively small diameter. The flame-ionization detector used in FIGURE 2 has the same construction as the detector shown in FIGURE 1.

The hydrogen is supplied through a gas regulator 40 that reduces the pressure to a low value required for the detector. The hydrogen is then passed through a filter 41 and a length of small diameter tubing 42. The tubing 42 acts as a flow regulating device to limit the flow of hydrogen to approximately 30 mls./min.

The remainder of the apparatus of FIGURE 2 is substantially the same as that shown in FIGURE 1. The flame-ionization cell 34 is connected to the amplifier detector circuit shown in FIGURE 1 and described above.

In both of the above embodiments the hand probe can be provided with a signal recorder in addition to the headphones worn by the operator and can also be equipped with means for igniting the hydrogen flame and the means for indicating when the flame is extinguished.

The pump, which is battery operated, may be driven from battery 21 that maintains a potential difference across the electrodes.

Although the apparatus has been described with particular reference to the detection of leaks in gas mains and service pipes, it will be realized that the apparatus is not confined to such use, but can be used in other instances where it is necessary to determine the presence of hydrocarbon gases.

We claim as our invention:

1. An apparatus for detecting the presence of hydrocarbons in gas samples comprising:
   a hydrogen flame-ionization detector;
   a minor flow path for directing gas to the burner of the detector;
   a major flow path for supplying combustion-supporting gas to the detector and removing products of combustion from the interior of the detector;
   a source of hydrogen, means for supplying said hydrogen to the burner of the detector for intermixing and burning with the gas of said minor flow path;
   a pump means, said pump means being disposed to sample gas suspected of contamination and supply it under pressure to both said minor flow path and said major flow path;
   conduit means having a flow control means, said conduit means being coupled to the discharge of the pump to exhaust the major portion of the output of the pump to the atmosphere; and
   circuit means, said circuit means being coupled to said detector to produce a signal whenever hydrocarbons are present in the gas sample.

2. The apparatus of claim 1 wherein the pump is provided with a hand probe for locating and introducing a gas sample to the detector.

3. The apparatus of claim 2 wherein the probe is provided with an enlarged end to introduce a larger volume of gas.

References Cited

UNITED STATES PATENTS 3,086,848   4/1963   Reinecke.
3,107,517   10/1963   Loyd et al. _____ 73—23
3,330,960   7/1967   Rich.

JOHN W. CALDWELL, Primary Examiner

D. MYER, Assistant Examiner

U.S. Cl. X.R.

23—232, 255; 73—23